3,736,289
Patented May 29, 1973

3,736,289
STABILIZATION OF UNSATURATED POLYESTERS AND RESULTING PRODUCTS
Clifford D. Marshall, Cherry Hill, N.J., assignor to Shell Oil Company, New York, N.Y.
No Drawing. Filed June 7, 1971, Ser. No. 150,736
Int. Cl. C08g 45/04
U.S. Cl. 260—837 R        10 Claims

ABSTRACT OF THE DISCLOSURE

New compositions containing stabilized unsaturated polyesters are disclosed. These compositions comprise: (1) a hydroxy-containing ethylenically unsaturated polyester of a glycidyl polyether of a polyhydric phenol and an ethylenically unsaturated monocarboxylic acid; (2) a dissimilar ethylenically unsaturated monomer; and (3) a half ester of an aliphatic alcohol and a polycarboxylic acid or anhydride, e.g., a mono-alkyl maleate. Also disclosed is the use of the above stabilized polyesters containing a copolymerizable unsaturated monomer such as styrene in the preparation of laminates.

BACKGROUND OF THE INVENTION

Cured polyepoxides have many desired properties, such as solvent and chemical resistance and good adhesion to metal, and there has been a desire to transfer many of such properties over to the conventional polyester type products. It has been found that this can be accomplished by reaction of the polyepoxides with an unsaturated monocarboxylic acid, such as acrylic or methacrylic acid. The products prepared in this manner are easily handled, combined readily with extenders, such as styrene, and cured in the presence of peroxide catalysts to form products having the desired properties.

It is known, however, that these above-described unsaturated polyesters, particularly when they are combined with unsaturated monomers, such as styrene, have limited shelf life, i.e., after storage at room temperature for some time they undergo premature gelation to form products having little utility. Efforts have been made to prevent the gelation by the addition of known stabilizing materials but the results have not been too satisfactory. In many cases, the stabilizing materials have added undesirable color to the product and/or have interfered with the cure of the polyester. It is, therefore, very desirable to have stabilizing material which would not affect color, would not interfere with the cure and could be used in very small amounts.

SUMMARY OF THE INVENTION

The present invention provides an economical and highly efficient process for stabilizing ethylenically unsaturated polyesters and particualrly the hydroxy-containing polyesters obtained by reacting polyepoxides with ethylenically unsaturated carboxylic acids, against premature gelation which comprises incorporating with the said polyesters a partial ester of (1) a polycarboxylic acid anhydride or acid such as maleic anhydride or maleic acid, (2) a dissimilar ethylenically unsaturated monomer, and (3) an aliphatic alcohol. The invention further provides stable compositions produced by this process.

DESCRIPTION OF THE PREFERRED EMBODIMENT

As a special embodiment, the invention provides a process for imparting a high degree of stability to mixtures of (a) unsaturated polyesters obtained by reacting a polyepoxide and preferably a glycidyl polyether of a polyhydric phenol with an unsaturated acid such as methacrylic acid and (b) a dissimilar ethylenically unsaturated monomer such as styrene which comprises incorporating into the said unsaturated polyester unsaturated monomer mixture half-ester of an aliphatic alcohol containing up to about 20 carbon atoms and maleic acid.

UNSATURATED POLYESTERS

The unsaturated polyesters to be stabilized by the presence of the present maleate esters include those materials possessing at least one ethylenic group and a plurality of ester groups, i.e.,

groups. This includes the monomeric esters as well as the polymeric esters as well as those which may be further substituted with various types of substituents. Examples of these include, among others, unsaturated esters of polycarboxylic acids, such as diallyl phthalate, divinyl adipate, diallyl succinate, diallyl glutarate, dicrotyl phathalate, dibutenyl succinate, diallyl chlorophthalate, and the like, esters of unsaturated acids and polyhydric alcohols wherein one or both reactants possess an unsaturated linkage. Illustrative examples of acids or anhydrides that may be used in making such esters include, among others, maleic acid, fumaric acid, itaconic acid, tetrahydrophthalic acid, cyclohexenedicarboxylic acid, chlorotetrahydrophthalic acid, dichloromaleic acid, the corresponding anhydrides, and the like. A portion of these unsaturated acids may be replaced by non-ethylenically unsaturated acids, such as glutaric, pimelic, adipic, succinic, sebasic, isosebacic, phthalic, isophthalic, terephthalic, oxalic, malonic, hexadecanedicarboxylic, diglycolic, thiodivaleric, sulfonyldivaleric, diphenyldicarboxylic, diphenic, p-phenylene diacetic, cis-hexahydro terephthalic and the like acids and the corresponding anhydrides. Polyhydric alcohols that may be used with the above-described unsaturated carboxylic acids include, among others, ethylene glycol, diethylene glycol, trimethylene glycol, tetramethylene glycol, pinacol, trimethylol propane, trimethtylol ethane, mannitol, sorbitol, glycerol, pentarerythritol, polyvinyl alcohol, polyallyl alcohol, hydrated glycidyl ethers of polyhydric phenols, and the like. It is also possible to use polyesters of any of the above-described saturated polycarboxylic acids and one or more unsaturated polyhydric alcohols alone or in admixture with any of the above-noted saturated polyhydric alcohols. Unsaturated alcohols that may be utilized include, among others, butenediol, cyclohexenediol, 2,5-dodecadienediol-1, 12-butynediol, and the like.

The above-described unsaturated polyesters may be prepared by a variety of known methods, some of which are described in "Unsaturated Polyesters," by Herman Boenig (1964).

A particularly preferred group of polyesters to be employed are the hydroxy-substituted ethylenically unsaturated polyesters as may be obtained by reacting polyepoxides with ethylenically unsaturated carboxylic acids.

The polyepoxides used in the process of the invention comprise those compounds possessing more than one vic-epoxy group, i.e., more than one

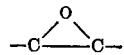

group. These polyepoxides may be saturated or unsaturated, aliphatic, cycloaliphatic, aromatic or heterocyclic and may be substituted if desired with non-interfering substituents, such as halogen atoms, phosphorus atoms, hydroxyl groups, ether radicals, and the like. They may also be monomeric or polymeric.

For clarity, many of the polyepoxides and particularly those of the polymeric type are described in terms of epoxy equivalent values. The meaning of this expression is described in U.S. 2,633,458. The polyepoxides used in the present process are those having an epoxy equivalency greater than 1.0.

Various examples of polyepoxides that may be used in the process of the inveniton are given in U.S. 2,633,458 and it is to be understood that so much of the disclosure of that patent relative to examples of polyepoxides is incorporated by reference into this specification.

Other examples include the glycidyl ethers of novolac resins, i.e., phenol-aldehyde condensates. Preferred resins of this type are those of the formula:

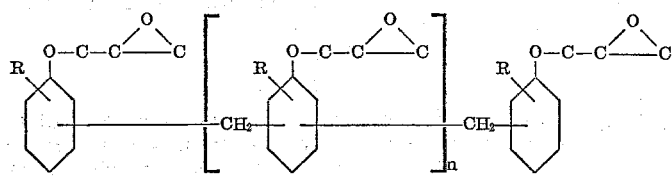

wherein R is hydrogen or an alkyl radical and $n$ is an integer of 1 to about 10. Preparation of these polyepoxides is illustrated in U.S. 2,216,099 and U.S. 2,658,885.

Other examples include the epoxidized esters of the polyethylenically unsaturated monocarboxylic acids, such as epoxidized linseed, soybean, perilla, oiticia, tung, walnut and dehydrated castor oil, methyl linoleate, butyl linoleate, ethyl 9, 12-octadecandienoate, butyl 9,12,15-octadecatrienoate, butyl eleostearate, mono or diglycerides of tung oil, fatty acids, monoglycerides of soybean oil, sunflower, rapeseed, hempseed, sardine, cottonseed oil, and the like.

Another group of the epoxy-containing materials used in the process of the invention include the epoxidized esters of unsaturated monohydric alcohols and polycarboxylic acids, such as, for example, diglycidyl phthalate,
diglycidyl adipate,
diglycidyl isophthalate,
di(2,3-epoxybutyl)adipate,
di(2,3-epoxybutyl)oxalate,
di(2,3-epoxyhexyl) succinate,
di(3,4-epoxybutyl) maleate,
di(2,3-epoxyoctyl) pimelate,
di(2,3-epoxybutyl) phthalate,
di(2,3-epoxyoctyl) tetrahydrophthalate,
di(4,5-epoxydodecyl) maleate,
di(2,3-epoxybutyl) terephthalate,
di(2,3-epoxypentyl) thiodipropionate,
di(5,6-epoxytetradecyl) diphenyldicarboxylate,
di(3,4-epoxyheptyl) sulfonyldibutyrate,
tri(2,3-epoxybutyl) 1,2,4-butanetricarboxylate,
di(5,6-epoxypentadecyl) tartarate,
di(4,5-epoxytetradecyl) maleate,
di(2,3-epoxybutyl) azelate,
di(3,4-epoxybutyl) citrate,
di(5,6-epoxyoctyl) cyclohexane-1,3-dicarboxylate,
di(4,5-epoxyoctadecyl) malonate.

Another group of the epoxy-containing materials include those epoxidized esters of unsaturated alcohols and unsaturated carboxylic acids, such as glycidyl glycidate; 2,3-epoxybutyl 3,4-epoxypentanoate; 3,4-epoxyhexyl 3,4-epoxypentanoate and 3,4-epoxycyclohexyl methyl epoxycyclohexane carboxylate.

Still another group of the epoxy-containing materials include epoxidized derivatives of polyethylenically unsaturated polycarboxylic acids, such as, for example, dimethyl 8,9,12,13-diepoxyeicosanedioate;
dibutyl 7,8,11,12-diepoxyoctadecanedioate;
dioctyl 10,11-diethyl-8,9,12,13-diepoxyeicosanedioate;
dihexyl 6,7,10,11-diepoxyhexadecanedioate;
dibutyl 3-butyl-3,4,5,6-diepoxycyclohexane-1,2-dicarboxylate;
dicyclohexyl 3,4,5,6-diepoxycyclohexane-1,2-dicarboxylate;
dibenzyl 1,2,4,5-diepoxycyclohexane-1,2-dicarboxylate and
diethyl 5,6,10,11-diepoxyoctadecyl succinate.

Still another group of epoxy-containing materials comprises the epoxidized polyesters obtained by (a) reacting an unsaturated polyhydric alcohol and/or unsaturated polycarboxylic acid or anhydride groups, such as, for example, the polyester obtained by reacting 8,9,12,13-eicosanedienedioic acid with ethylene glycol, the polyester obtained by reacting diethylene glycol with 2-cyclohexene-1,4-dicarboxylic acid and the like, and mixtures thereof, with (b) an epihalohydrin.

Still another group comprises the epoxidized polyethylenically unsaturated organic carboxylic acids which may be monocarboxylic or polycarboxylic. Examples of the acids which are suitable for reaction with an epihalohydrin to produce suitable epoxy esters include acrylic acid, methacrylic acid, cyclohexene carboxylic acid, maleic acid, crotonic acid, alpha-phenylacrylic acid, tetrahydrophthalic acid, 2,4-octadienedicarboxylic acid, didecadienoic acid, and the like, and corresponding anhydrides.

Particularly preferred acids to be reacted with a halohydrin such as epichlorohydrin, comprise the ethylenically unsaturated acids, such as, for example, acrylic acid, methacrylic acid, crotonic acid, alpha-phenylacrylic acid, alpha-cyclohexylacrylic acid, maleic acid, alpha-chloromaleic acid, tetrahydrophthalic acid, itaconic acid, fumaric acid, cyanoacrylic acid, methoxyacrylic acid, and the like, and the anhydrides thereof.

Also particularly preferred are the partial esters prepared by reacting polycarboxylic acids with diepoxides and particularly the alkyl, alkenyl, cycloalkyl and cycloalkenyl esters of polycarboxylic acids, such as, for example, allyl hydrogen maleate, butyl hydrogen maleate, allyl hydrogen phthalate, allyl hydrogen succinate, allyl hydrogen fumarate, butenyl hydrogen tetrahydrophthalate, cyclohexenyl hydrogen maleate, cyclohexyl hydrogen tetrahydrophthalate, and the like, and mixtures thereof.

Coming under special consideration, particularly because of the superior coating properties of the resulting unsaturated polyesters, are those derived from ethylenically unsaturated monocarboxylic acids and unsaturated partial esters, and especially the unsaturated aliphatic monocarboxylic acids containing 3 to 10 carbon atoms, and the alkenyl and alkyl esters of alkenedioic acids containing up to 12 carbon atoms.

Preferred catalysts to be utilized in the process comprise the onium salts, and preferably those containing phosphorus, sulfur or nitrogen, such as, for example, the phosphonium, sulfonium and ammonium salts of inorganic acids. Examples of these include, among others, benzyltrimethylammonium sulfate,
tetramethylammonium chloride,
benzyltrimethylammonium nitrate,
diphenyldimethylammonium chloride,
benzyltrimethylammonium chloride,
diphenyldimethylammonium nitrate,
diphenylmethylsulfonium chloride,
tricyclohexylsulfonium bromide,
triphenylmethylphosphonium iodide,
diethyldibuytlphosphonium nitrate,
trimethylsulfonium chloride,
dicyclohexyldiamylphosphonium iodide,
benzyltrimethylammonium thiocyanate,
and the like, and mixtures thereof.

Preferred onium salts to be employed include those of the formulae

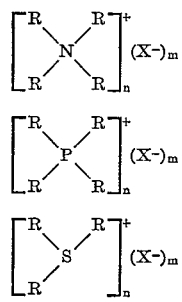

wherein R is a hydrocarbon radical, and preferably an aryl, alkyl, alkenyl, cycloalkyl, cycloalkenyl or alkaryl radical containing up to 12 carbon atoms, X is an ion of an inorganic acid, and particularly a halogen ion, nitrate, sulfate or phosphate radical, $m$ is the valency of the X ion and $n=m$.

The amount of the above-noted polyepoxide and acid to be used in the reaction may vary over a wide range. In general, these reactants are used in approximately chemically equivalent amounts. As used herein and in the appended claims, a chemical equivalent amount of the polyepoxide refers to that amount needed to furnish one epoxy group per carboxyl group. Excess amounts of either reactant can be used. Preferred amounts range from about 0.5 to 2 equivalents of carboxylic acid per equivalent of epoxide used.

The amount of the catalyst employed may also vary over a considerable range. In general, the amount of the catalyst will vary from abut 0.05% to about 3% by weight, and more preferably from 0.5% to 2% by weight of the reactants.

The reaction may be conducted in the presence or absence of solvents or diluents. In most cases, the reactants will be liquid and the reaction may be easily effected without the addition of solvents or diluents. However, in some cases, whether either or both reactants are solids or viscous liquids, it may be desirable to add diluents to assist in effecting the reaction. Examples of such materials include the inert liquids, such as ketones, inert hydrocarbons as xylene, toluene, cyclohexane, and the like.

If solvents are employed in the reaction and the resulting product is to be used for coating purposes, the solvent may be retained in the reaction mixture. Otherwise, the solvent can be removed by any suitable method such as by distillation and the like.

Temperature employed in the reaction will generally vary from about 50° C. to about 150° C. In most cases, the reactants will combine in the presence of these catalysts at a very rapid rate and lower temperatures will be satisfactory. Particularly preferred temperatures range from about 50° C. to 120° C.

The reaction will be preferably conducted under atmospheric pressure, but it may be advantageous in some cases to employ subatmospheric or superatmospheric pressures.

The course of the reaction may be conveniently followed by determination of the acidity. The reaction is considered to be substantially complete when the acidity has been reduced to about 0.020 eq./100 g. or below.

The process of the invention may be effected in any suitable manner. The preferred method merely comprises adding the polyepoxide, acid, catalyst, and solvent or diluent if desired, in any order and then applying the necessary heat to bring about the reaction. The reaction mixture may then be distilled or stripped to remove some components such as solvents, excess reactants, and the like.

The polyester products obtained by the above process will vary from liquids to solid resins. The products will possess a plurality of free OH groups and a plurality of ethylenic groups. The products will be of higher molecular weight than the basic polyepoxide from which they are formed and will generally possess one or more ester groups per polyepoxide unit.

UNSATURATED COMONOMERS

For many of these applications, the unsaturated polyesters are used in admixture with unsaturated monomers, and preferably liquid monomers possessing at least one $CH_2=<$ group, such as styrene, alpha-methylstyrene, chlorostyrene, dichlorostyrene, vinyl naphthalene, vinyl phenol and the like; unsaturated esters, such as acrylic and methacrylic esters, vinyl acetate, vinyl benzoate, vinyl chloroacetate, vinyl laurate, and the like; unsaturated acids, such as acrylic and alpha-alkylacrylic acids, butenoic acid, allylbenzoic acid, vinylbenzoic acid, and the like; halides, such as vinyl chloride, vinylidene chloride; nitriles, such as acrylonitrile, methacrylonitrile; diolefins, such as butadiene, isoprene, methylpentadiene; esters of polycarboxylic acids, such as diallyl phthalate, divinyl succinate, diallyl maleate, divinyl adipate, dichloroallyl tetrahydrophthalate, and the like, and mixtures thereof. These are preferably used in amounts varying from about 0.5% to 90% by weight of the mixture, and preferably 5% to 55% by weight of the mixture.

STABILIZERS

The stabilizing material to be added to the above-described unsaturated polyester with or without the addition thereto of a copolymerizable unsaturated monomer such as styrene, include the so-called half-esters of long-chain aliphatic alcohols and maleic acid or meleic anhydried, e.g., monoalkyl maleates.

ALCOHOLS

Suitable alcohols include the aliphatic alcohols having up to 20 carbon atoms, and preferably the mono-alcohols containing from about 5 to 18 carbon atoms.

Suitable alcohols include n-butyl, sec-butyl, n-amyl alcohol, isoamyl alcohol, t-amyl alcohol, n-hexyl alcohol, cyclohexanol, n-octyl alcohol, iso-octyl alcohol, nonyl alcohol, n-decyl alcohol, lauryl alcohol, myristyl alcohol, cetyl alcohol, stearyl alcohol, and mixtures of these alcohols.

Preferred, however, is iso-octyl alcohol because of its commercial availability and because of the outstanding results obtained.

Other suitable esters which are suitable stabilizers may be prepared by reacting polyhydric alcohols such as glycerol and glycols with suitable polycarboxylic acids or anhydride such as maleic acid or anhydride.

POLYCARBOXYLIC ACIDS AND ANHYDRIDES

Suitable polycarboxylic acids and polycarboxylic anhydrides include the aliphatic and aromatic, unsaturated and saturated compounds.

Suitable aliphatic polycarboxylic compounds include, among others, maleic acid, maleic anhydride, fumaric acid, succinic acid and succinic anhydride, citraconic acid, mesaconic acid, isocrotonic acid, crotonic acid, oleic acid, elaidic acid, cinnamic acid, angelic acid, tiglic acid, and testanic acid.

Suitable aromatic polycarboxylic compounds include, among others, phthalic acid, phthalic anhydride, isophthalic acid, terephthalic acid, and trimelletic acid. However, the preferred polycarboxylic acid is maleic acid.

PREPARATION OF THE PARTIAL ESTERS

The ester stabilizers are prepared by conventional esterification methods wherein the alcohol and acid or anhydrides are heated, in the presence or absence of esterification catalysts, for a time sufficient to complete the esterification.

Preferably, 1 mole of acid, or anhydride is reacted with 1 mole of alcohol, although up to 1.50 moles of one may be reacted with 1 mole of the other.

The esterification is generally carried out at temperatures of from 75° F. to 400° F., and preferably from about 100° F. to 250° F. An inert atmosphere may be used but is not generally required. The reaction may be performed at subatmospheric, atmospheric or superatmospheric pressures.

Suitable catalysts include the so-called mineral acids, such as hydrochloric acid, sulfuric acid and phosphoric acid. If an acid anhydried is used, a preferred catalyst is sodium acetate and the like.

The catalyst, if employed, is used in a catalytic amount, i.e., form about 0.1% to about 10% by weight based on the reactants.

The ester stabilizer will, in general, be used in amounts from about 1% to about 10% with from about 1% to about 5% by weight based on the total reactants being preferred.

The stabilization may be accomplished by merely mixing the ester stabilizer directly with the unsaturated polyester. The unsaturated polyester may be used as such in solvent solution or in admixture with the resinous materials. The addition may be made during the preparation of the polyester, or may be made thereafter.

After combination, the components should be thoroughly mixed as by stirring, blending and the like.

Modifying agents such as plasticizers, pigments, and fillers may be added to the material to be stabilized before, at the same time as or after the addition of the ester stabilizer.

The new compositions of the invention are characterized by their improved storage stability, i.e. improved resistance to premature gelation when exposed to storage temperatures say from 0° F. to about 140° F. The length of the stabilization will vary with the temperature as shown in the working examples at the end of the specification. At storage temperatures of 40° F. or below, the compositions have indefinite stability.

The stabilized polyester compositions can be used for a variety of applications. Those compositions containing the polyesters by themselves as well as those extended with unsaturated monomers such as styrene and the like can be easily polymerized to form valuable plastic products.

The process of the invention may be used to stabilize the unsaturated esters by themselves or as mixtures of the esters with any of the above-described extenders. As the stabilization problem is particularly acute with the compositions containing the vinyl monomers, these are the preferred materials to be used in the process. When the polyester is used in combination with the above components, such as styrene, the amount of the other component may vary over a wide range, but it is generally preferred to have at least 5% by weight of the polyester present. In working with components, such as the unsaturated monomers as styrene, it is preferred to utilize from about 1% to about 85% of the dissimilar monomer and from 99% to 15% of the hydroxy-substituted polyester.

The polymerization of the above-noted polyesters or mixtures with monomers may be accomplished by any suitable method. Preferred method comprises reacting the polyester or its mixture with monomers in the presence of a free radical yielding catalyst. Examples of such catalysts include the peroxides, such as benzoyl peroxide, tertiary butyl hydroperoxide, ditertiary butyl peroxide, hydrogen peroxide, potassium persulfate, methyl cyclohexyl peroxide, cumene hydroperoxide, acetyl benzoyl peroxide, tetralin hydroperoxide, phenylcyclohexane hydroperoxide, tertiary butylisopropylbenzene hydroperoxide, tertiary butyl peracetate, tertiary butylacetate, tertiary butyl perbenzoate, ditertiary amyl perphthalate, diteriary butyl peradipate, tertiary amyl percarbonate, and the like, and mixtures thereof; azo compounds such as 2,2'-azobis- isobutyronitrile, dimethyl 2,2'-azobisisobutyrate, 2,2'-azobis - 2,4 - dimethylvaleronitrile, 2,2'-azobisisobutyramide, and the like. Particularly preferred catalysts include methylethylketone peroxide, diaroyl peroxides, tertiary alkyl hydroperoxides, alkyl peresters of carboxylic acids and particularly those of the above-noted groups which contain no more than 18 carbon atoms per molecule and have a decomposition temperature below 150° C.

Other materials may also be added to the mixtures before or during polymerization. These include plasticizers, stabilizers, extenders, oils, resins, tars, asphalts, and the like, as well as all types of coloring or pigments to give the material the desired color.

The above-noted components may be mixed in any order. Temperatures employed in the polymerization will vary depending upon the reactants and catalysts selected. In general, polymerization temperatuees may vary from about 20° C. to about 200° C. and more preferably from 20° C. to 175° C.

The unsaturated polyesters and their above-noted mixtures with other monomers may be utilized in a wide variety of different applications. They may be utilized in the preparation of coatings and impregnating compositions, in the preparation of adhesives for metals, wood, cement, and the like, and in the preparation of reinforced composite products, such as laminated products, filament windings, and the like. In these latter applications, the polyester compositions are applied to the fibrous products, such as glass fibers or sheets, the material formed into the desired object. The reaction may take place at ambient temperature or higher temperature depending on the choice of curing system.

The following examples are given to illustrate the process of the invention. It should be understood that the examples are given for the purpose of illustration and the invention is not to be regarded as limited to any of the specific conditions recited therein. Unless otherwise indicated, parts in the examples are parts by weight.

EXAMPLE I

This example illustrates the preparation of one of the present ester stabilizers, i.e., the isooctyl half-ester of maleic acid. One mole (98 g.) of maleic anhydride was reacted with one mole (130 g.) of isooctyl alcohol in a 500-ml. round bottom flask equipped with a stirrer, thermometer and condenser. The charge was maintained at 130° F. for four hours. Infrared analysis confirmed completion of the reaction to produce the isooctyl half-ester of maleic acid.

EXAMPLE II

This example illustrates the preparation of composition containing a viscous liquid unsaturated polyester (Polyester A) prepared from glylcidyl polyether of 2,2-bis(4-hydroxyphenyl) propane and methacrylic acid having the structure:

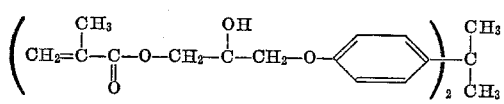

and isooctyl ester of maleic acid in styrene solution. The example also illustrates the superiority of the claimed compositions in comparison to the non-stabilized polyester styrene solution.

50 parts by weight of the above-noted polyester was combined with 50 parts by weight of styrene. To this mixture was added stabilizing amounts of the isooctyl ester prepared as in Example I as indicated in Table I. The time for gelation was determined in hours at 140° F. The period which was free of gelation, or the shelf-life of the composition, is indicated in the Table I.

TABLE I—COMPOSITION

| Grams of isooctyl ester of maleic acid added to 100 grams of 50/50 mixture of Polyester A/styrene: | Shelf[1] life, hours, at 140° F. |
|---|---|
| 0 | 27 |
| 0.34 | >32<96 |
| 0.57 | >32<96 |
| 0.80 | >32<96 |
| 1.03 | >105<166 |
| 3.41 | >105<166 |
| 5.70 | >105<166 |
| 7.98 | >105<166 |
| 10.26 | >105<166 |

[1] The broad spread in range resulted because samples gelled during weekend period.

The data clearly show the improved stability achieved using the isooctyl ester of maleic acid as the stabilizer, even in amounts as low as about 1%.

EXAMPLE III

This example shows the cured properties of a resin system stabilized by small amounts of isooctyl maleate. To 96.5 grams of a 50/50 mixture of Polyester A/styrene and 3.5 grams of isooctyl maleate contained in a metal can at room temperature were added with stirring 2.0 grams methyl ethyl ketone peroxide, 0.4 gram dimethylaniline and 0.1 gram cobalt naphthenate solution (6% cobalt). The mixture gelled in 44 minutes and had a Barcol hardness of 25 after 20 hours. Similar results were obtained with 97.25 grams of the Polyester A/styrene mixture and 2.75 grams of isooctyl maleate. With 100 grams of the Polyester A/styrene mixture and no isooctyl maleate the gel time was 86 minutes and the Barcol hardness was 43.

I claim as my invention:

1. A composition stabilized against premature gelation comprising
    (1) a hydroxy-containing ethylenically unsaturated polyester of (a) a glycidyl polyether of a polyhydric phenol or a polyhydric alcohol and (b) an ethylenically unsaturated monocarboxylic acid,
    (2) a dissimilar ethylenically unsaturated monomer, and
    (3) a half-ester of a monohydric aliphatic alcohol having up to 20 carbon atoms and a polycarboxylic acid or polycarboxylic acid anhydride.

2. A composition as in claim 1 wherein the polyester is prepared by reacting a glycidyl polyether of 2,2-bis(4-hydroxyphenyl) propane and methacrylic or acrylic acid.

3. A composition as in claim 1 wherein the half-ester is a monoalkyl maleate.

4. A composition as in claim 3 wherein the half-ester is iso-octyl maleate.

5. A curable composition comprising a mixture of (1) an unsaturated polyester of (a) a glycidyl polyether of a polyhydric phenol and (b) an ethylenically unsaturated monocarboxylic acid, (2) a dissimilar ethylenically unsaturated monomer, and (3) a monoalkyl maleate.

6. A composition as in claim 5 wherein the unsaturated polyester is prepared by reacting a glycidyl polyether of 2,2-bis(4-hydroxyphenyl) propane and methacrylic acid.

7. A composition as in claim 5 wherein the monoalkyl maleate is derived from a monoalkanol containing from 5 to 18 carbon atoms.

8. A composition as in claim 5 wherein the half-ester is iso-octyl maleate.

9. A composition as in claim 5 wherein the unsaturated monomer is styrene.

10. A cured composition obtained by reacting the composition of claim 5 with a peroxide catalyst.

References Cited

UNITED STATES PATENTS

| 3,506,736 | 4/1970 | Najvar | 260—836 |
| 3,646,044 | 2/1972 | Sekmakas | 260—47 |
| 3,408,422 | 10/1968 | May | 260—837 |

WILLIAM SHORT, Primary Examiner

T. E. PERTILLA, Assistant Examiner

U.S. Cl. X.R.

117—124 E, 127, 147, 161 ZB, 169 A; 161—185, 260—2 EP, 18 PF, 28.5 AS, 32.8 EP, 33.6 EP, 47 EP, 47 EC, 59, 75 EP, 78.4 EP